(12) United States Patent
Quarberg

(10) Patent No.: US 7,621,356 B2
(45) Date of Patent: Nov. 24, 2009

(54) PALLET PULLER TOOL

(76) Inventor: Craig D. Quarberg, 1201 Golf Course Rd., Monticello, MN (US) 55362

( * ) Notice: Subject to any disclaimer, the term of this patent is extended or adjusted under 35 U.S.C. 154(b) by 272 days.

(21) Appl. No.: 11/601,201

(22) Filed: Nov. 17, 2006

(65) Prior Publication Data
US 2008/0116434 A1 May 22, 2008

(51) Int. Cl.
*B60S 13/00* (2006.01)
(52) U.S. Cl. .............................. 180/12; 180/11; 180/13; 180/19.1; 180/19.2; 180/19.3; 280/259; 280/260; 280/261; 280/475
(58) Field of Classification Search ............. 180/11–13, 180/19.1–19.3; 280/259–261, 475
See application file for complete search history.

(56) References Cited

U.S. PATENT DOCUMENTS

| | | | |
|---|---|---|---|
| 3,269,740 A * | 8/1966 | Hutchinson ..................... 280/3 |
| 6,302,381 B1 * | 10/2001 | Roll ........................... 254/425 |
| 6,347,677 B1 * | 2/2002 | Collins ........................ 180/13 |
| 6,619,671 B1 | 9/2003 | Fine | |
| 6,739,601 B1 * | 5/2004 | Fine .............................. 280/3 |
| 6,779,616 B1 * | 8/2004 | Brown .......................... 180/13 |
| 6,926,261 B1 * | 8/2005 | Renshaw ..................... 254/420 |
| 6,945,343 B1 * | 9/2005 | Moreau et al. ................. 180/13 |

* cited by examiner

*Primary Examiner*—Glenn Dayoan
*Assistant Examiner*—Michael R Stabley
(74) *Attorney, Agent, or Firm*—James J. Paige; Nikolai & Mersereau, P.A.

(57) ABSTRACT

A powered, directionally steerable trailer jack that can be used to elevate and lower a trailer tongue and having a caster wheel assembly affixed to a lower end of the jack. The caster wheel assembly includes a shroud having the wheels' axle journaled for rotation at a lower end thereof along with a pair of shafts also journaled for rotation in the shroud and oriented parallel to the axle. A chain and sprocket arrangement provides a low-speed, high torque transmission between one of the shafts and the axle and a high-speed, low torque transmission between the other of the shafts and the axle. The trailer jack assembly can be tilted out of its vertical disposition to provide adequate clearance when the trailer is being pulled over uneven road surfaces. The power for driving the wheels may be provided manually by means of a crank for turning one or the other of the shafts or by an electric motor coupled one of the shafts.

19 Claims, 7 Drawing Sheets

PALLET PULLER TOOL

BACKGROUND OF THE INVENTION

I. Field of the Invention

This invention relates generally to trailer jacks for raising and lowering a trailer tongue and coupler relative to a hitch ball on a towing vehicle, and more particularly to such a trailer jack having a steerable, powered wheel for moving a trailer to facilitate alignment of the tongue mounted coupler with the hitch ball or for otherwise repositioning the trailer at a desired location.

II. Discussion of the Prior Art

Motorized, directionally steerable trailer tongue jacks are known in the art. U.S. Pat. No. 6,779,616 to Brown describes a device having a height adjustment power transmission screw and a drive and steering system for the jack's wheel. The drive is an electronically remote controlled dc motor whose output shaft directly drives the wheels' axle. Separate electric motors are also used for elevation and steering which unduly increases the complexity and cost of the trailer jack.

The Moreau et al. U.S. Pat. No. 6,945,343 describes a motorized trailer jack in which a dc motor has its output shaft coupled through a pinion gear to a toroidal rack gear affixed to the wheel. While this simplified drive arrangement overcomes objections to the device described in the Brown '616 patent, it presupposes that easy access to a 12 volt battery source is always available and no means are provided for driving the wheel in the event that a 12 volt connector is not available at the hitch of the towing vehicle.

A need, therefore, exists for a trailer jack having a powered wheel that may be driven either electrically by means a motor or mechanically through a manually actuated transmission. The present invention provides such a need.

SUMMARY OF THE INVENTION

In accordance with the present invention, a trailer jack comprises a mounting bracket that is adapted to be secured to a tongue of a trailer. Attached to the mounting bracket is a jackscrew of the type having an outer tubular housing and an inner tubular member concentrically disposed in the tubular housing and surrounding an elongated screw carrying a nut that is also joined to the inner tubular member to longitudinally displace the tubular housing relative to the inner tubular member. A shroud is secured to the lower end of the inner tubular member, the shroud having an axle journaled in bearings at a lower end thereof, where the axle supports a pair of wheels in a side-by-side relationship along with a first toothed sprocket of a relatively large diameter keyed to the axle. First and second drive shafts are journaled for rotation in the shroud and a low speed, high torque transmission couples the first drive shaft to the first toothed sprocket that is keyed to the wheels' axle and a high-speed, low torque transmission couples the second drive shaft to that axle.

The mounting bracket includes a flange plate adapted to be clamped to the trailer tongue along with a mounting plate secured to the tubular housing of the jackscrew where the mounting plate is pivotally secured to the flange plate. A releasable latch is provided for selectively latching the tubular housing in a position at a predetermined angle above the horizontal when the trailer is being towed or in a position generally perpendicular to the trailer tongue when the jack is to be used to raise and lower it.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
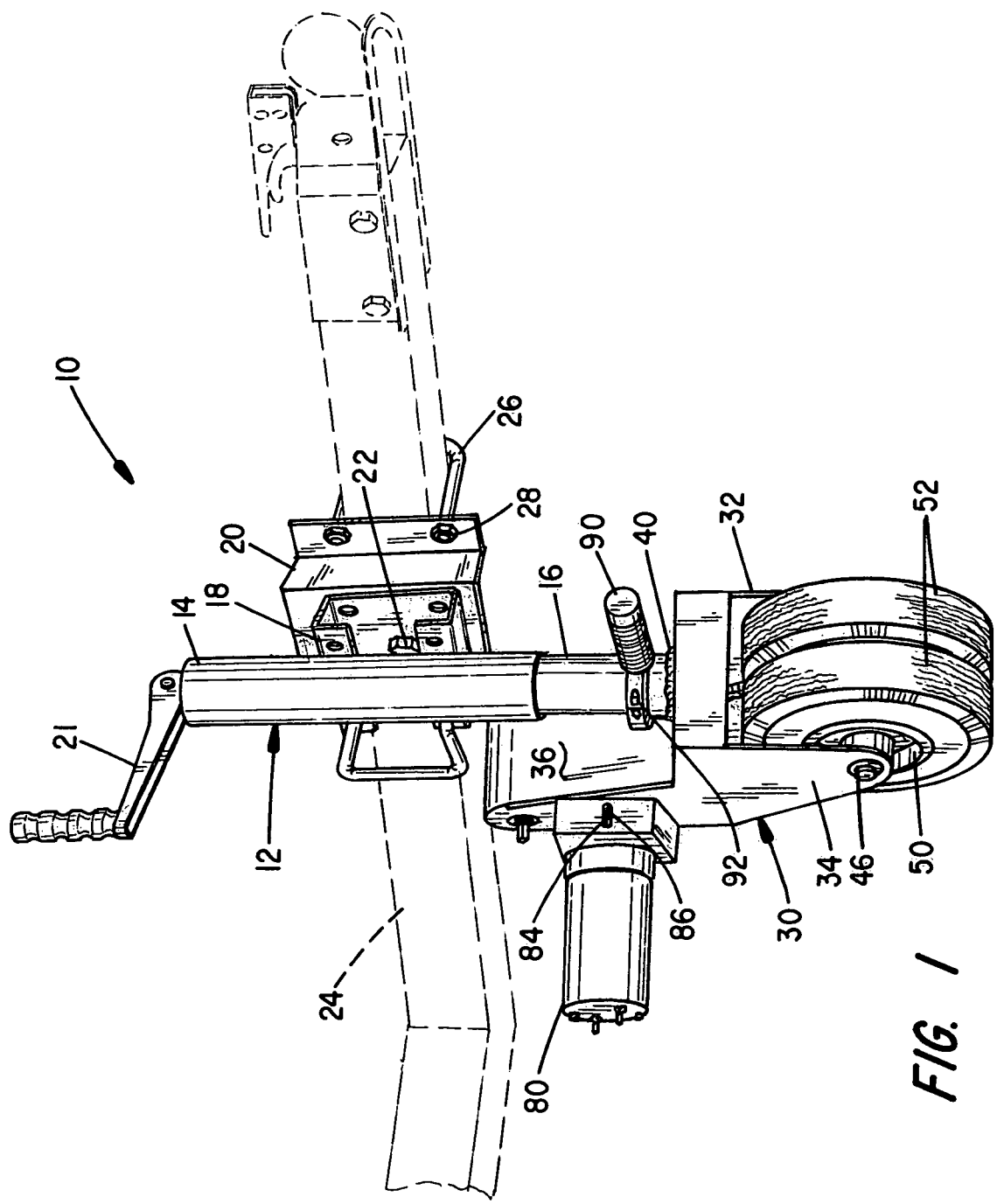
FIG. 1 is a perspective view from the front of the trailer jack with powered wheels constructed in accordance with the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Figure 2:
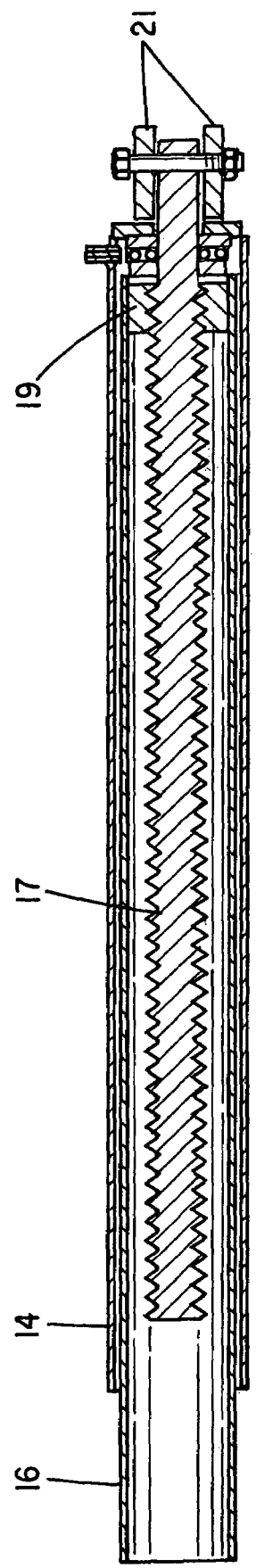
FIG. 2 is a longitudinal cross section view through the jackscrew portion of the assembly.

FIG. 1 is a perspective view of the improved trailer jack constructed in accordance with the present invention. It is indicated generally by numeral 10 and is seen to include a conventional jackscrew assembly 12 comprising an outer tubular housing 14 and an inner tubular cylinder 16. As seen in the view of FIG. 2, the tubular cylinder 16 surrounds a concentrically disposed elongated screw 17. A nut 19 is disposed on the threads of the screw and the nut is welded or swaged to the inside diameter of the tubular member 16 such that rotation of the crank 21 produces longitudinal displacement of the outer tubular housing 14 with respect to the inner tubular member 16. The jackscrew 12 may be constructed in accordance with the teachings of the Renshaw U.S. Pat. No. 6,926,261, which is hereby incorporated by reference.

Figure 3:
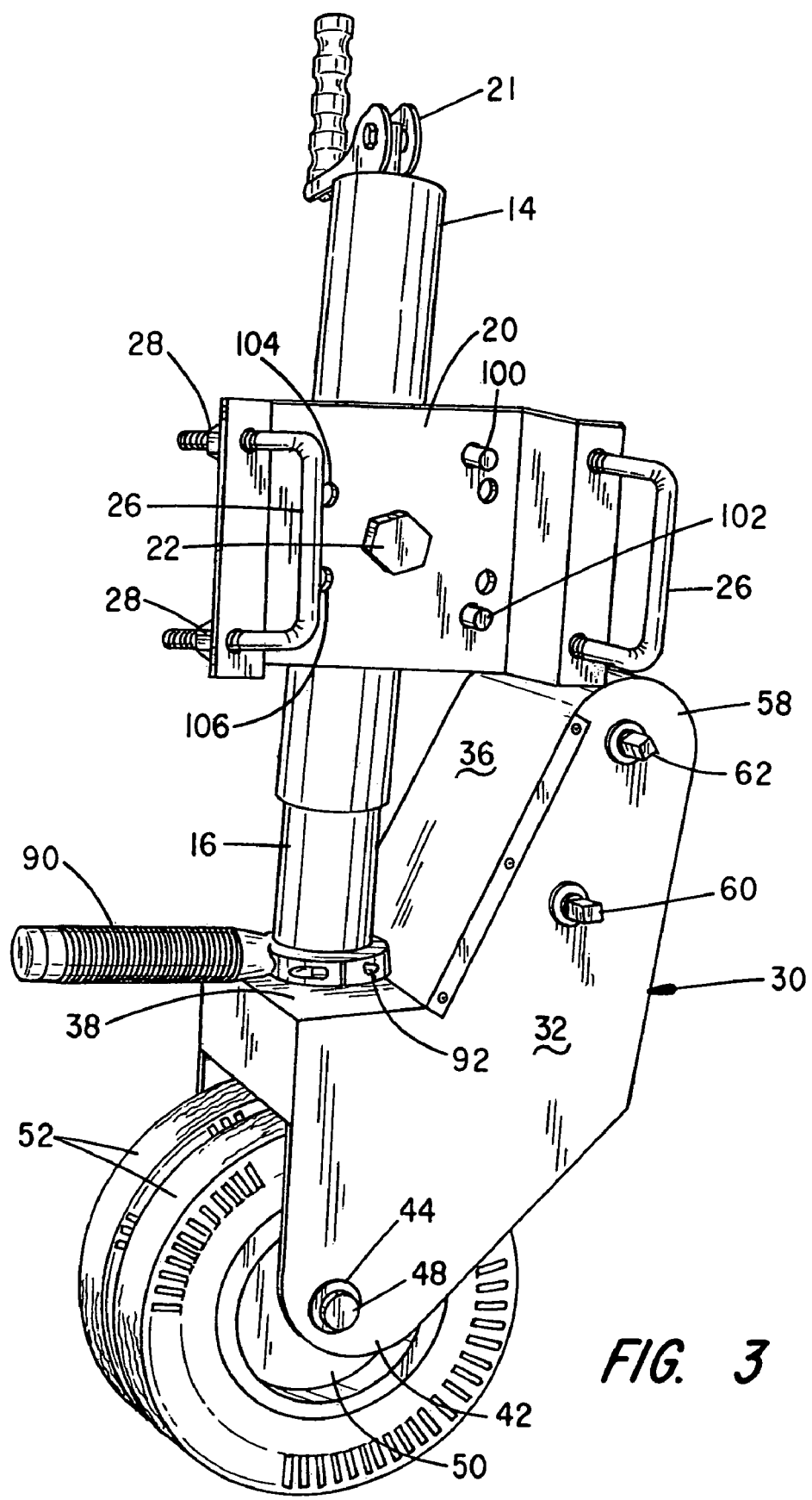
FIG. 3 is a perspective view thereof from the side.
Figure 6:
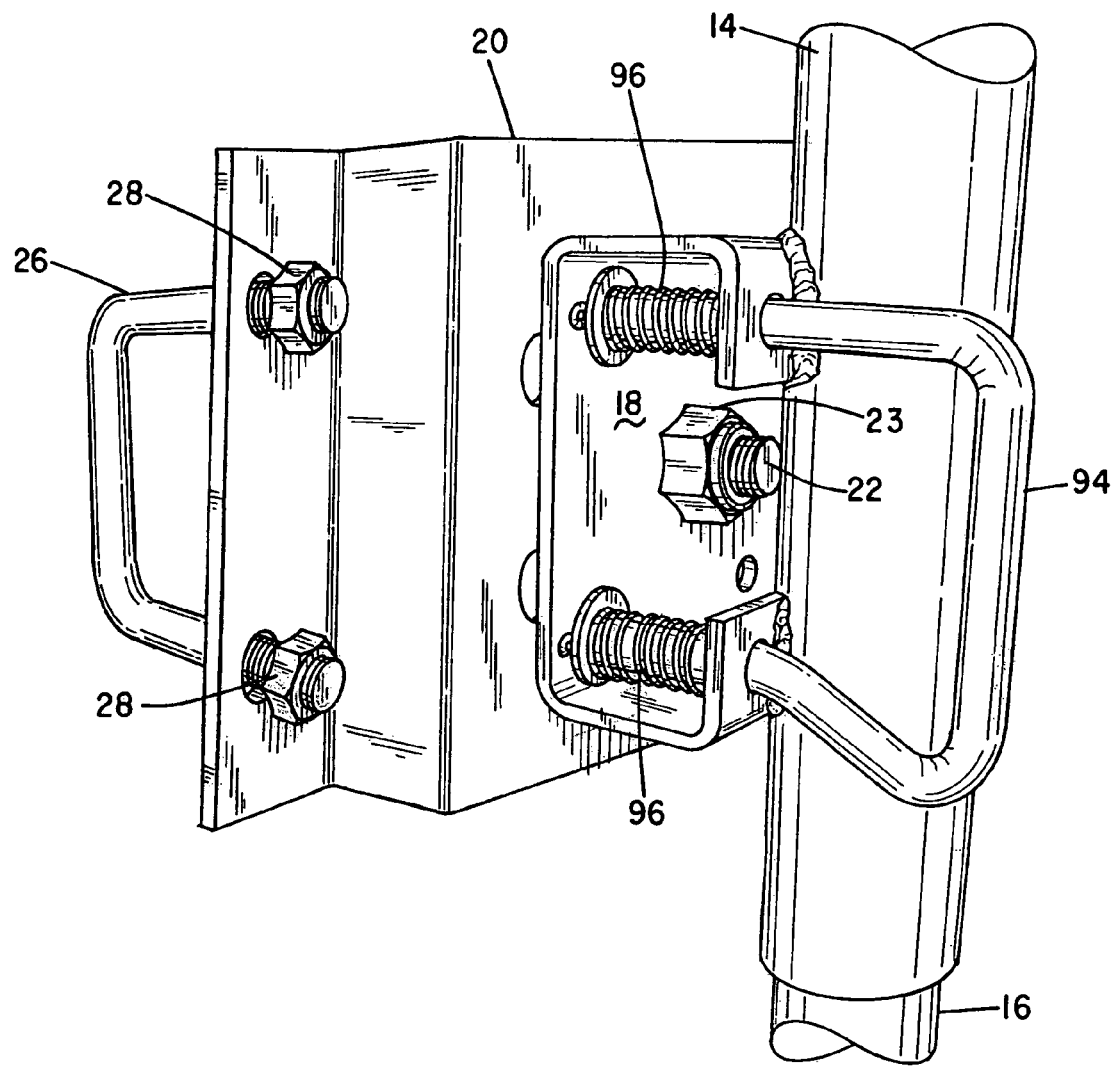
FIG. 6 is a detailed view of the mounting bracket used to secure the trailer jack assembly to the tongue of a trailer.

Welded or otherwise affixed to the outer peripheral surface of the outer tubular housing 14 is a mounting plate 18 and that is pivotally fastened to a flange plate 20 by a shoulder bolt 22 and nut 23. The flange plate 20 is adapted to be clamped to the tongue of a trailer which is shown in phantom line in FIG. 1 and identified by numeral 24. Referring next to FIGS. 3 and 6, a preferred way of clamping the trailer jack assembly 10 to a trailer tongue is by means of a pair of U-bolts 26 that fit around the tongue 24 and secured by nuts 28.

A sheet metal shroud 30 includes a pair of opposed sidewalls 32 and 34 that are held in parallel, spaced-apart relationship by an intermediate wall 36. The intermediate wall 36 includes a platform area 38 to which the lower end of the inner tubular member 16 is welded, as at 40 (FIG. 1).

The shroud 30 has a lower arcuate end 42 having aligned apertures formed through each of the sidewalls 32 and 34 and containing Oilite® sleeve bearings, as at 44 and 46. Extending through the sleeve bearings is an axle 48 on which are keyed a pair of wheel hubs 50. The hubs each carry a tire 52 which may be inflatable or foam-filled. By providing dual tires, the trailer jack 10 can be moved through soft ground or sand without sinking to the point where rolling movement becomes difficult. Also keyed to the axle 48 between the two wheels 52 is a relatively large diameter toothed sprocket 54 (FIG. 4) which, when driven by a chain 56, turns the axle 48 and the hubs 50.

Figure 5:
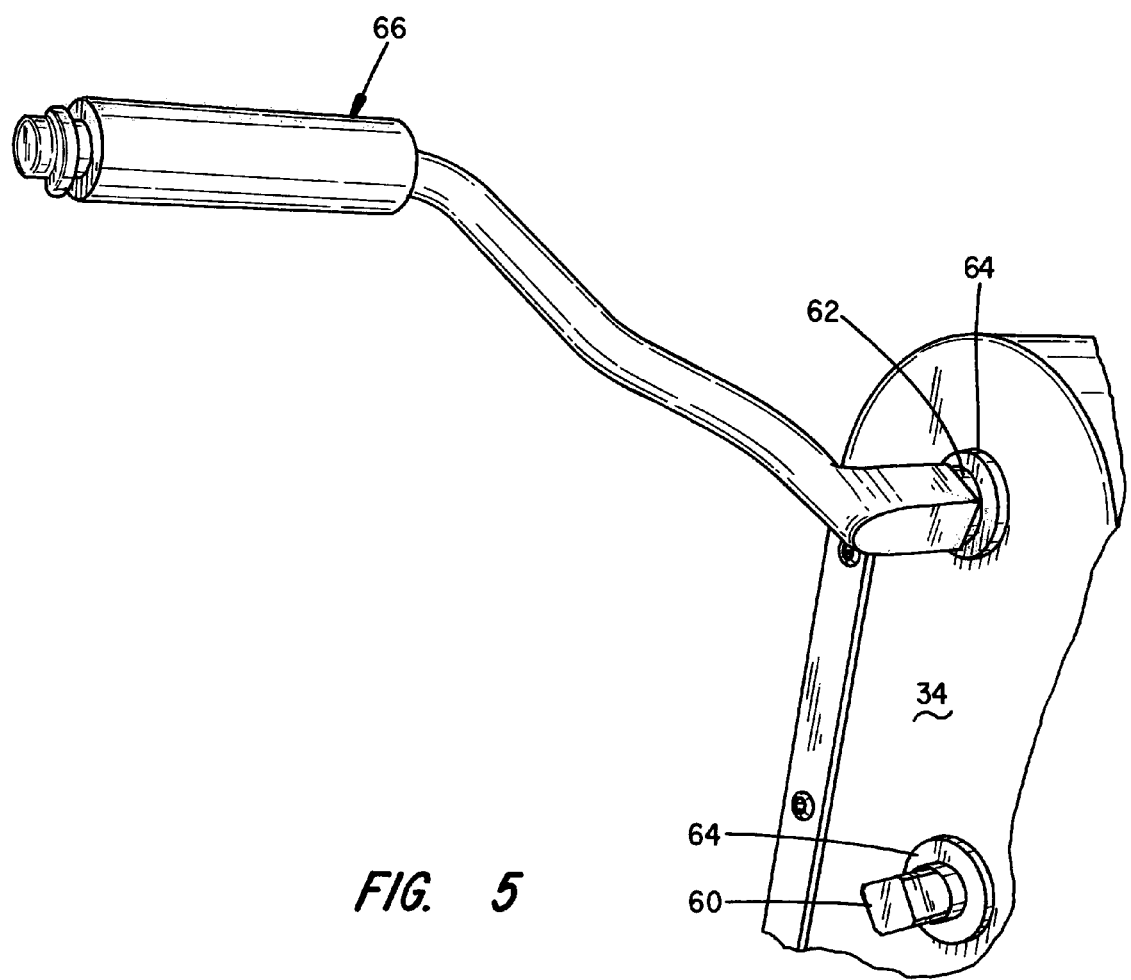
FIG. 5 is a partial view showing a crank drive device.

Journaled for rotation in an upper portion 58 of the shroud 32 are a pair of parallel shafts 60 and 62. More particularly, Oilite bearings, as at 64, are mounted in the opposed walls 32 and 34 of the shroud and the shafts 60 and 62 are rotationally mounted therein. Each of the shafts 60 and 62 has a squared-off end on a portion thereof that extends outward from the opposed sidewalls of the shroud 30 allowing those shafts to be rotated by a crank 66 as shown in FIG. 5.

Figure 4:
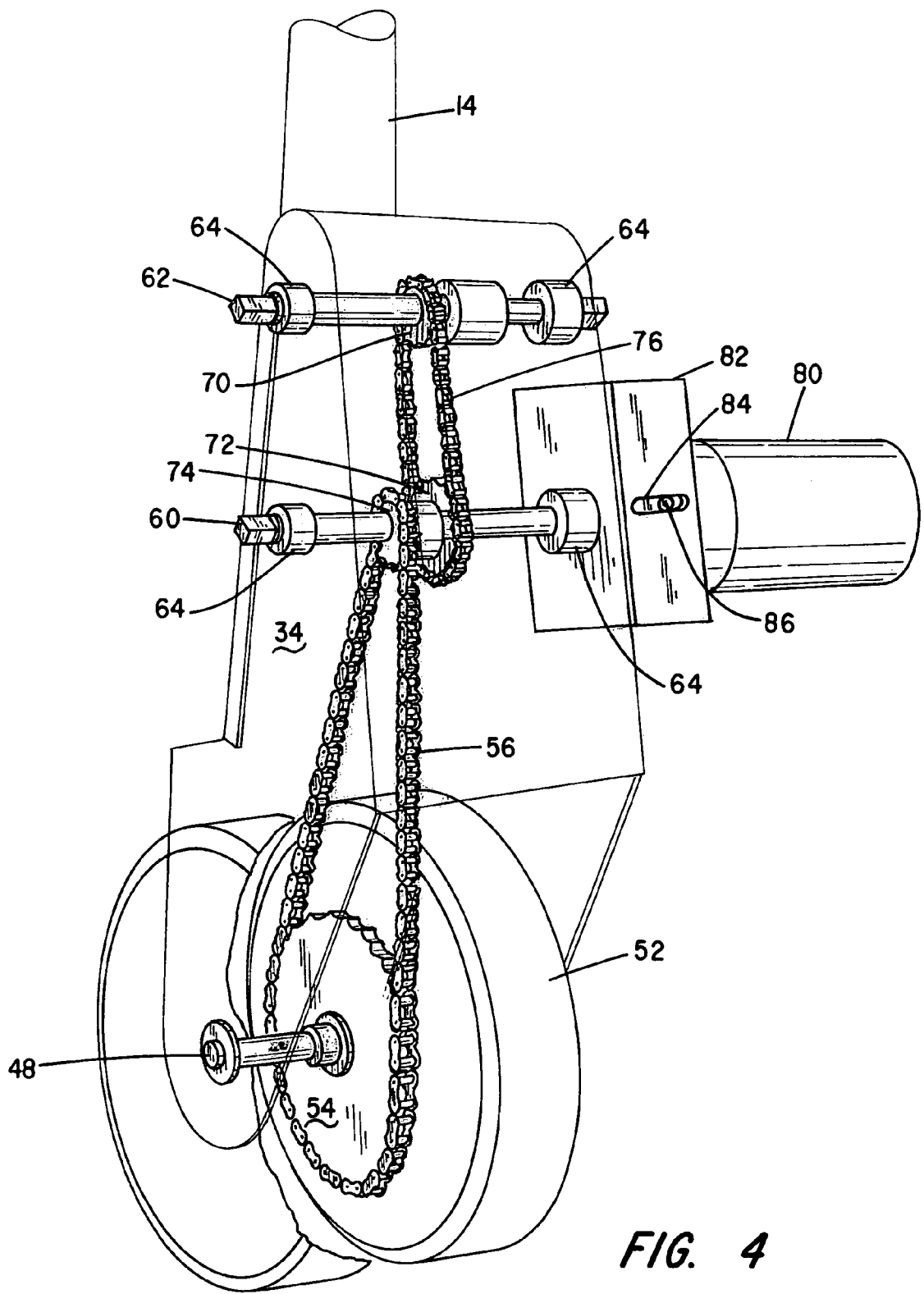
FIG. 4 is a view drawn as if the shroud portion is transparent so as to illustrate the transmission system employed.

FIG. 4 also shows the transmission for coupling the drive shafts 60 and 62 to the sprocket 54 keyed to the axle 48. It is to be first noted that the shafts 60 and 62 are oriented parallel to the axle 48. The shaft 62 carries a relatively small diameter toothed sprocket 70 while the shaft 60 carries a tooth sprocket of an intermediate diameter 72 and a sprocket of lesser diameter 74 thereon. An endless chain 76 is deployed about the sprockets 70 and 72 and the chain 56 is deployed about the sprocket 74 and the large diameter sprocket 54. The sprocket 74 and the chain 56 cooperating with the large diameter sprocket 54 may be considered to be a relatively high-speed, low torque drive for the axle 48 while the sprocket 70 and the chain 76 driving the sprocket 72 and ultimately the sprocket 54 can be considered a low speed, high torque drive for the axle 48. Without limitation, sprocket 70 may be 1 inch in diameter, sprocket 72, 3 inch, sprocket 74, 2 inch and sprocket 54, 5 inch.

Rather than being driven by a hand crank 66, the powered wheels of the trailer jack 10 may also be driven by a dc motor 80 that can be selectively coupled and uncoupled from the shaft 60 by providing a slide mount bracket 82 that is affixed to the sidewall 32 of the shroud 30. The bracket 82 is generally U-shaped in an end view thereof and the opposed side legs of the bracket each include an elongated slot, as at 84, through which is fitted a clamping bolt 86 that screws into threaded bores formed in the motor housing. When the bolt 86 is moved all the way to the left in the slot 84 in FIG. 4, the motor's shaft (not shown) becomes mechanically coupled to the end of the shaft 60 and, when the motor is energized by a dc current, it drives the shaft 60 to, in turn, drive the wheels 52.

When it is desired to manually drive the wheels 52, the screws 86 are loosened and the motor is retracted in the direction indicated by the arrow in FIG. 4, which uncouples the motor's shaft from the shaft 60. The crank shown in FIG. 5 may then be used to turn either shaft 60 or 62. When shaft 60 is selected, an average adult male can move a trailer and load weighing about 1000 lbs. When shaft 62 is selected for cranking, a load of about 2000 lbs. can be moved, but at a slower speed.

When the trailer jack assembly 10 is in the position illustrated in FIG. 1 and the crank 18 is turned, the coupler on the end of the tongue 24 can be raised or lowered relative to a hitch ball on a towing vehicle, depending upon the direction of rotation of the crank 18. In order to bring the coupler socket into vertical alignment with a hitch ball, a user may move and steer the trailer tongue by grasping the handle 90 affixed to the lower end portion of the inner tubular member 16 by an annular clamp 92 while at the same time either manually driving the wheels 52 using the crank 66 or by connecting the motor 80 back to a source of dc power, e.g., the battery on the towing vehicle.

From the foregoing description, persons skilled in the art can readily appreciate how the trailer jack assembly 10 can be used to either elevate or lower a trailer tongue relative to the height of a hitch ball on a towing vehicle and how the trailer can be repositioned by selectively driving the wheels 50 by means of a hand crank or a motor as the castor wheel assembly is manually steered using the handle 90 to rotate the caster wheel assembly about a vertical axis.

Once the trailer is coupled to the ball hitch on the towing vehicle and is about to be towed over the road, the user will pull the handle 94 (FIG. 6) against the force exerted by the return springs 96 until the free ends of the handle 94 no longer extend through the apertures 100 and 102 (FIG. 3) in the mounting bracket 20, thus allowing the trailer jack assembly 10 to be rotated out of its vertical orientation about the bolt 22 to an angle such that the tires 52 are elevated relative to the ground and preferably at a predetermined angle that is above the horizontal to guarantee clearance even when traversing an irregular road surface. Once the jack assembly has been rotated in this fashion, the user will again release his grip on the handle 94, allowing the plate 20 to again become latched by the spring-loaded handle 94 to the mounting bracket 18 this time using apertures 100 and 104 or 102 and 106 rather than 100 and 102 to hold the jack assembly in its inclined disposition.

Figure 7:
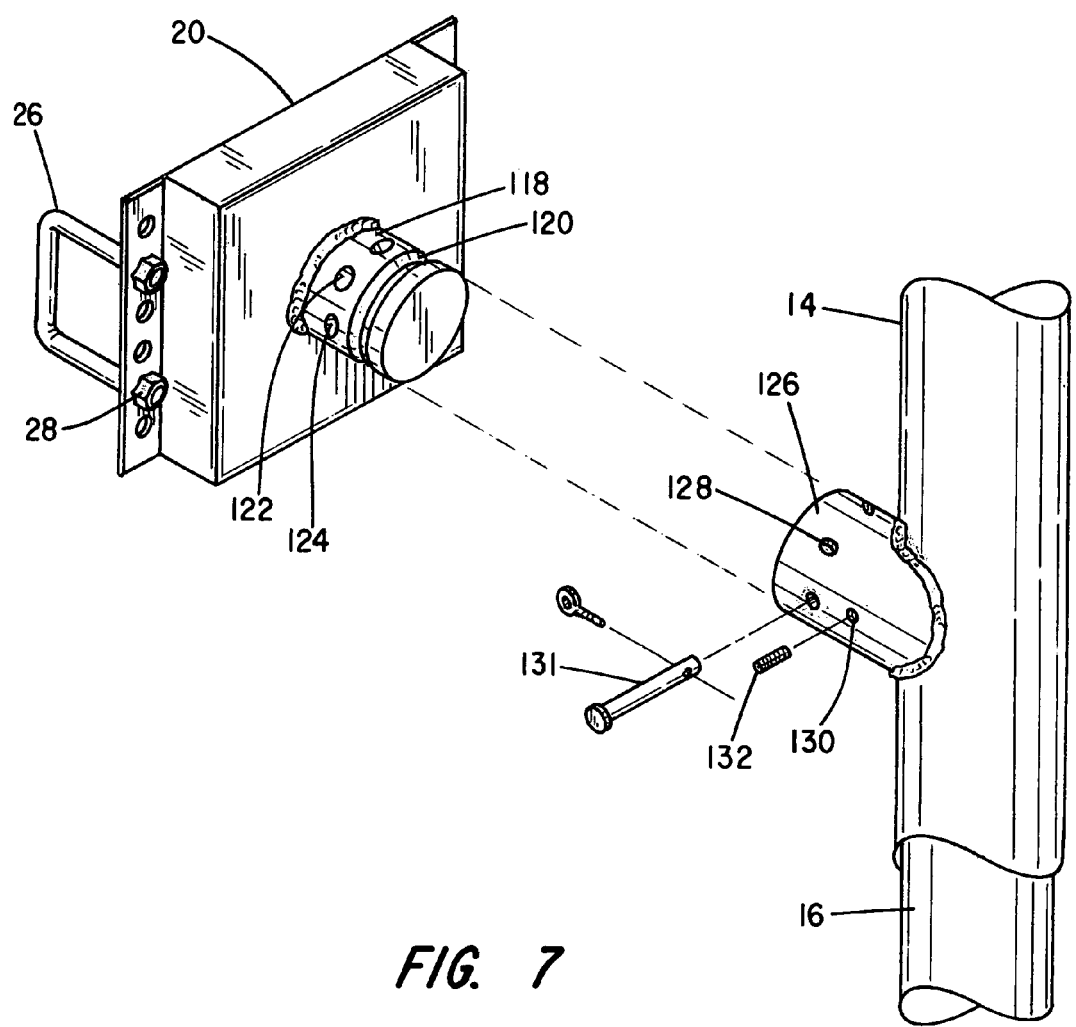
FIG. 7 is an exploded, perspective view of an alternative trailer jack mounting arrangement.

FIG. 7 is a perspective view of an alternative arrangement for removably securing the trailer jack mechanism to a trailer tongue. A bracket 20' having a generally U-shaped profile with coplanar side flanges 110 and 112 extending laterally from side legs thereof is adapted to be secured to the trailer tongue by means of U-bolts passing through selected ones of the apertures 114-116. Welded to the outer surface of the bracket 20' is a cylindrical stub 118 having an annular V-groove 120 formed in a peripheral surface thereof proximate the free end of the cylindrical stub 118. Bores, as at 122 and 124, are drilled diametrically through the cylindrical stub 118.

Welded to the outer cylinder 14 of the jack is a cylindrical socket 126 whose inside diameter is sized to receive the cylindrical stub 118 therein. Formed diametrically through the socket 126 is a bore 128 that when aligned with one of the bores 122 or 124 of the cylindrical stub 118 can receive a locking pin therethrough for securing the jack assembly 12 to the mounting bracket 20'. The placement of the bores, as at 122, 124, are such that the jack assembly 12 can be positioned with its longitudinal axis in a vertical orientation with the wheels contacting the ground in those instances where the trailer is uncoupled from the towing vehicle or rotated to a position inclined at a predetermined angle to the vertical, with the wheels clearing the ground, when the trailer is being towed. Without limitation, two of the bores may be inclined plus or minus 25° with respect to the horizontal such that when the jack assembly is in its stowed position, the wheels are directed upward relative to the trailer's tongue.

The socket further includes at least one and preferably several threaded bores as at 130 for receiving set screws (132) which when fully inserted will engage the V-groove 120 to prevent the jack assembly 12 from separating from its mounting bracket even when no latching pin is inserted through the bore 128 and through a selected one of the bores 122, 124. However, when desired, a user may loosen the set screws 132 and slip the jack assembly free from the mounting bracket on the trailer tongue if it is desired to store the jack assembly in a secure location.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A trailer jack comprising:
   (a) a mounting bracket adapted to be secured to a tongue of a trailer, the mounting bracket includes a U-shaped flange plate adapted to be clamped to the trailer tongue, the flange plate having a cylindrical stub attached to a planar surface thereof, the cylindrical stub including a plurality of bores extending diametrically therethrough, a tubular sleeve affixed to the tubular housing of the jack screw and adapted to receive the cylindrical stub therein, the tubular sleeve having a diametric bore formed therethrough and alignable with a selected one of the plurality of bores in the cylindrical stub, and a pin adapted to be inserted in aligned bores in the sleeve and stub;
   (b) a jack screw having an outer tubular housing and an inner tubular member concentrically disposed in the tubular housing with means for longitudinally displacing the tubular housing relative to the inner tubular member and with the mounting bracket affixed to the outer tubular housing;
   (c) a shroud secured to the lower end of the inner tubular member, the shroud having an axle journaled in bearings at a lower end of the shroud, the axle supporting a pair of wheels in side-by-side relation along with a first sprocket of a relatively large diameter affixed to the axle;
   (d) at least one shaft supporting a second sprocket of a relatively small diameter compared to the diameter of the first sprocket and said at least one shaft being journaled for rotation in the shroud, the one shaft being parallel to said axle;
   (e) an endless chain deployed about the first sprocket and the second sprocket; and
   (f) means for applying a torque to the one shaft.

2. The trailer jack as in claim I wherein the mounting bracket includes a flange plate adapted to be clamped to the trailer tongue; a mounting plate secured to the tubular housing of the jack screw; the mounting plate being pivotally secured to the flange plate; and a releasable latch for selectively latching the tubular housing in a position at a predetermined angle above the horizontal or in a position generally perpendicular to the trailer tongue.

3. The trailer jack as in claim 2 and further including a third sprocket of a diameter greater than that of the relatively small second sprocket and also mounted on the one shaft and a further shaft journaled for rotation in the shroud; the further shaft extending parallel to the one shaft and having a fourth sprocket of a diameter less than that of the third sprocket; an endless chain deployed about the third and fourth sprockets; and means for applying a torque to either the one shaft or the further shaft.

4. The trailer jack as in claim 2 wherein the means for applying a torque to the one shaft is a hand crank.

5. The trailer jack as in claim 2 wherein the means for applying a torque to the one shaft is a DC motor.

6. The trailer jack as in claim 3 wherein the means for applying a torque to the one shaft or the further shaft is a hand crank.

7. The trailer jack as in claim 5 and further including means for mounting the DC motor to the shroud to permit selective coupling or uncoupling of the DC motor to the one shaft.

8. The trailer jack as in claim and further including a handle operatively coupled to one of the shroud and a lower end portion of the inner tubular member to facilitate rotation of the inner tubular member about a longitudinal axis of the tubular housing to steer the pair of wheels.

9. The trailer jack as in claim 1 and further including an annular V-groove formed in the cylindrical stub proximate a free end thereof; the sleeve includes at least one threaded bore formed through a peripheral wall thereof at a location that is aligned with the V-groove when the stub is inserted into the sleeve; and at least one set screw screwed into the threaded bore for releasably holding the sub within the tubular sleeve.

10. A trailer jack comprising:
   (a) a mounting bracket adapted to be secured to a tongue of a trailer;
   (b) a jack screw having an outer tubular housing and an inner tubular member concentrically disposed in the tubular housing with means for longitudinally displacing the tubular housing relative to the inner tubular member and with the mounting bracket affixed to the outer tubular housing;
   (c) a shroud secured to the lower end of the inner tubular member, the shroud having an axle journaled in bearings at a lower end of the shroud, the axle supporting a pair of wheels in side-by-side relation along with a first sprocket of a relatively large diameter affixed to the axle;
   (d) first and second drive shafts journaled for rotation in said shroud, said first and second drive shafts having ends extending beyond said shroud for receiving an applied torque;
   (e) a low speed, high torque transmission coupling the first drive shaft to the axle; and
   (f) a high speed, low torque transmission coupling the second drive shaft to the axle.

11. The trailer jack as in claim 10 and further having a means for applying a torque to a selected on of the first and second shafts.

12. The trailer jack as in claim 11 where the torque applying means is a hand crank.

13. The trailer jack as in claim 11 wherein the torque applying means is a dc motor.

14. The trailer jack as in claim 10 and further including a handle operatively coupled to one of the shroud and a lower end portion of the inner tubular member to facilitate rotation of the inner tubular member about a longitudinal axis of the tubular housing to steer the pair of wheels.

15. A trailer jack comprising:
   (a) a mounting bracket adapted to be secured to a tongue of a trailer, the mounting bracket includes a U-shaped flange plate adapted to be clamped to the trailer tongue, the flange plate having a cylindrical stub attached to a planar surface thereof, the cylindrical stub including a plurality of bores extending diametrically therethrough, an annular V-groove formed in the cylindrical stub proximate a free end thereof; the sleeve includes at least one threaded bore formed through a peripheral wall thereof at a location that is aligned with the V-groove when the stub is inserted into the sleeve; and at least one set screw screwed into the threaded bore for releasably holding the sub within the tubular sleeve, a tubular sleeve affixed to the tubular housing of the jack screw and adapted to receive the cylindrical stub therein, the tubular sleeve having a diametric bore formed therethrough and alignable with a selected one of the plurality of bores in the cylindrical stub, and a pin adapted to be inserted in aligned bores in the sleeve and stub;

(b) a jack screw having an outer tubular housing and an inner tubular member concentrically disposed in the tubular housing with means for longitudinally displacing the tubular housing relative to the inner tubular member and with the mounting bracket affixed to the outer tubular housing;

(c) a shroud secured to the lower end of the inner tubular member, the shroud having an axle journaled in bearings at a lower end of the shroud, the axle supporting a pair of wheels in side-by-side relation along with a first sprocket of a relatively large diameter affixed to the axle;

(d) at least one shaft supporting a second sprocket of a relatively small diameter compared to the diameter of the first sprocket and said at least one shaft being journaled for rotation in the shroud, the one shaft being parallel to said axle;

(e) an endless chain deployed about the first sprocket and the second sprocket; and (f) means for applying a torque to the one shaft.

16. The trailer jack as in claim 15 wherein the mounting bracket includes a flange plate adapted to be clamped to the trailer tongue; a mounting plate secured to the tubular housing of the jack screw; the mounting plate being pivotally secured to the flange plate; and a releasable latch for selectively latching the tubular housing in a position at a predetermined angle above the horizontal or in a position generally perpendicular to the trailer tongue.

17. The trailer jack as in claim 16 and further including a third sprocket of a diameter greater than that of the relatively small second sprocket and also mounted on the one shaft and a further shaft journaled for rotation in the shroud; the further shaft extending parallel to the one shaft and having a fourth sprocket of a diameter less than that of the third sprocket; an endless chain deployed about the third and fourth sprockets; and means for applying a torque to either the one shaft or the further shaft.

18. The trailer jack as in claim 16 wherein the means for applying a torque to the one shaft is a hand crank.

19. The trailer jack as in claim 16 wherein the means for applying a torque to the one shaft is a DC motor.

* * * * *